Jan. 2, 1968    W. E. ROSS, JR., ET AL    3,361,478
BOTTOM DUMP TRAILER STRUCTURE
Filed June 29, 1966    4 Sheets-Sheet 3
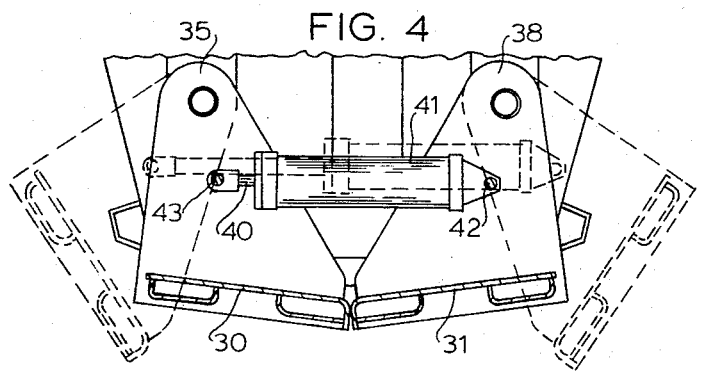
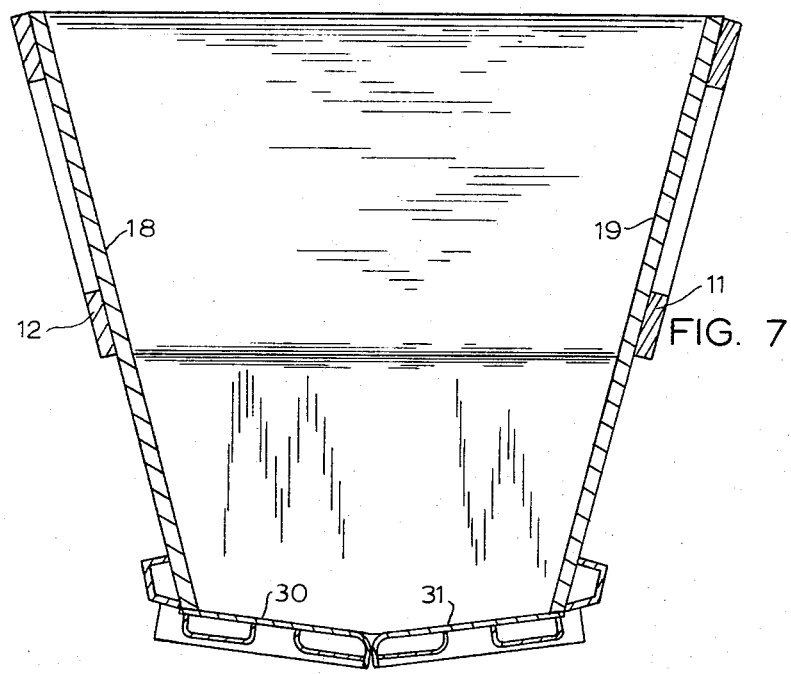
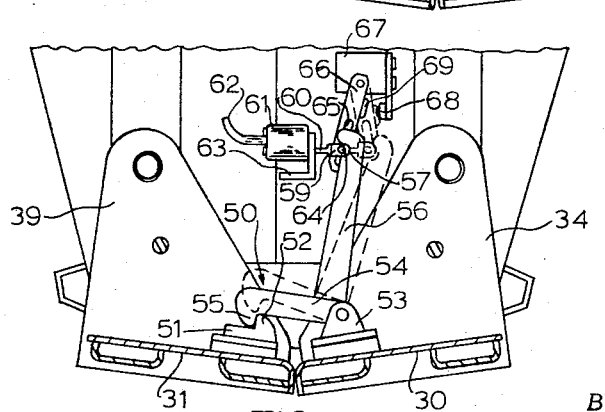
INVENTORS
Walter E. Ross, Jr.
Homer E. Gibbs
BY
ATTORNEY

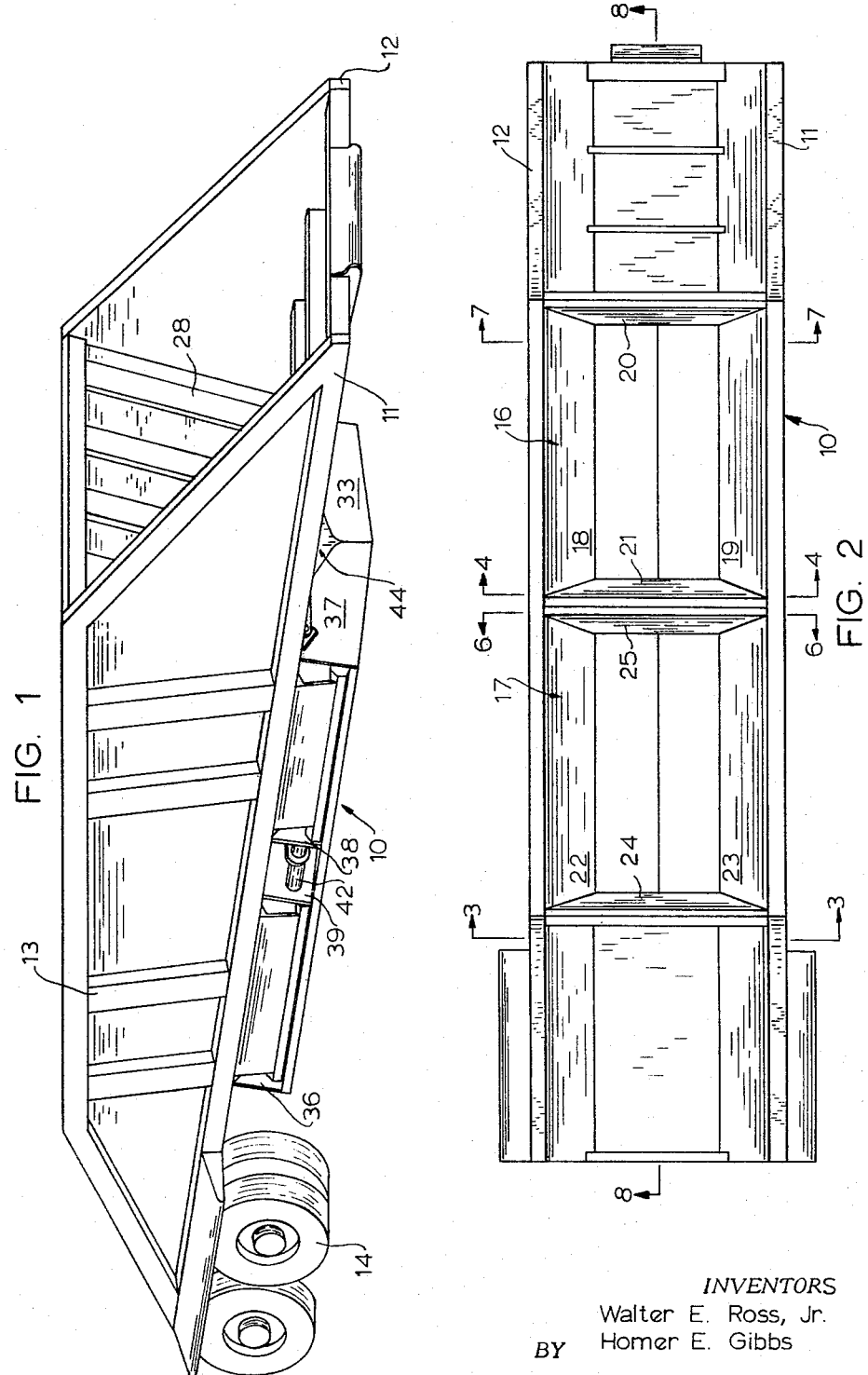

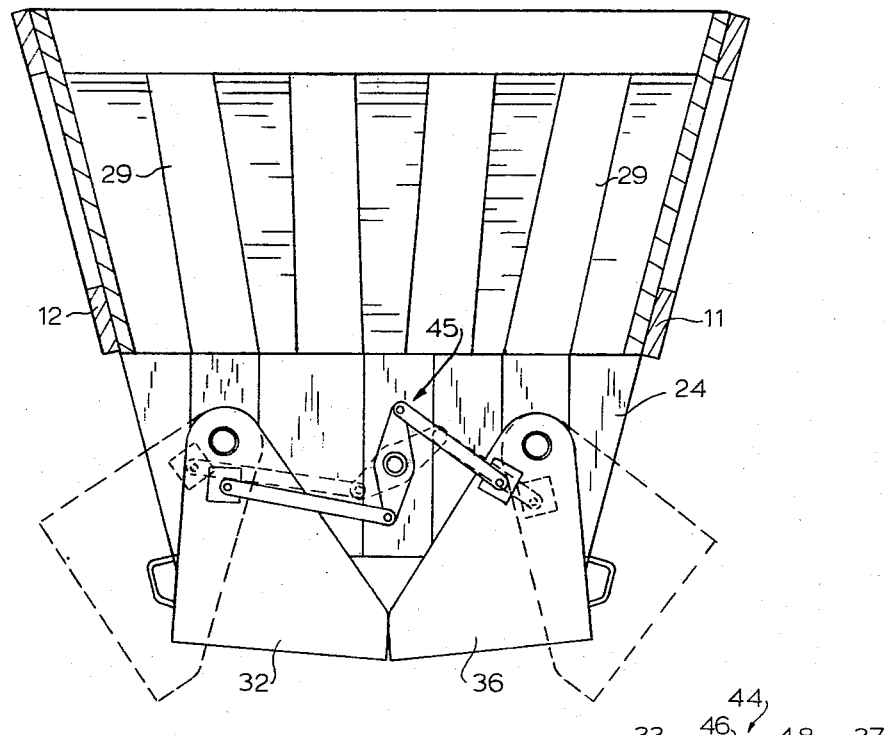
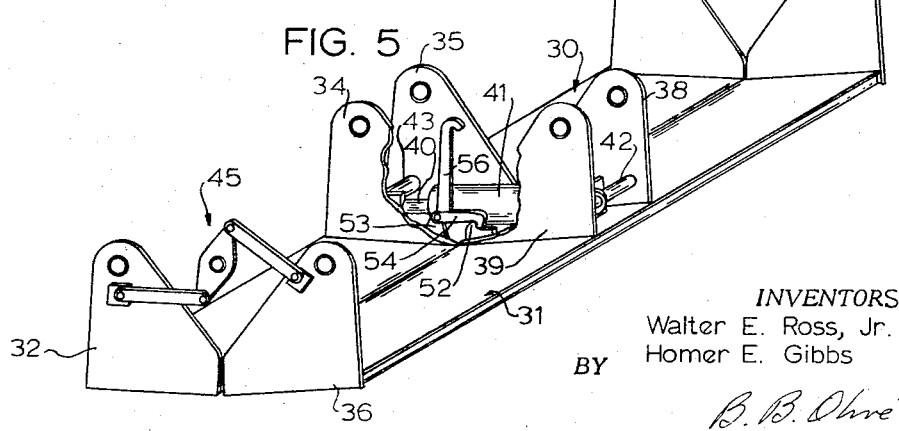

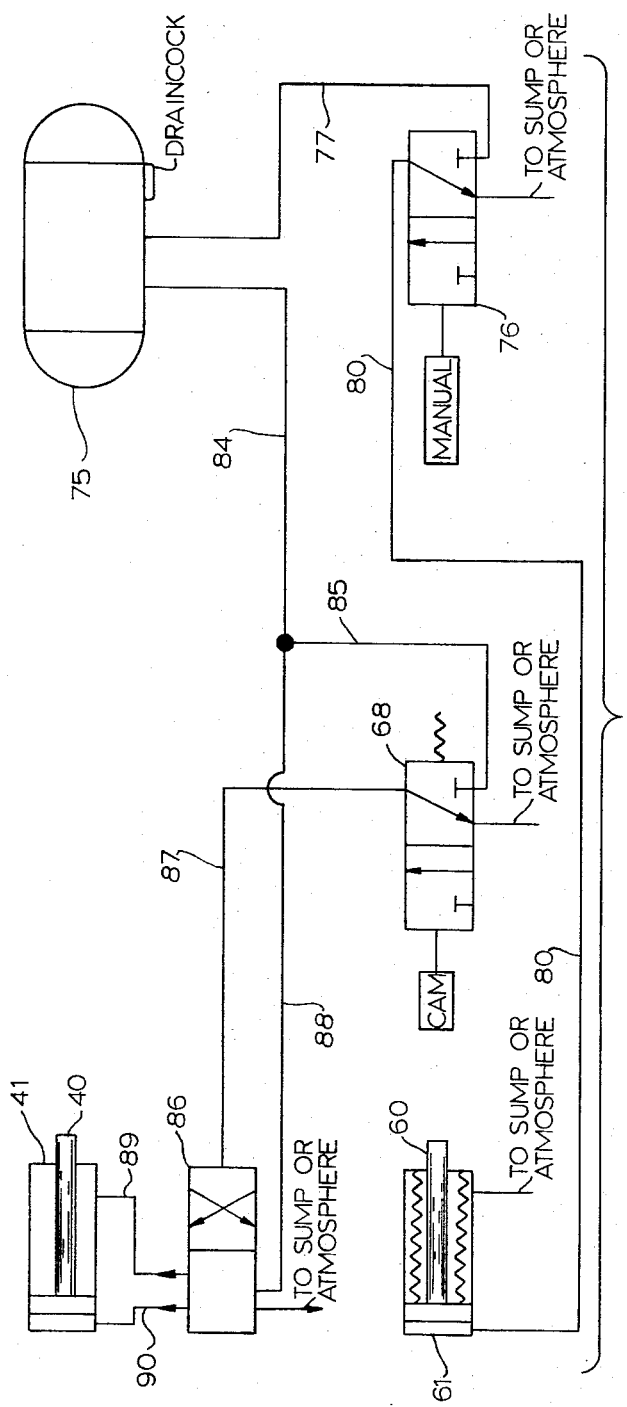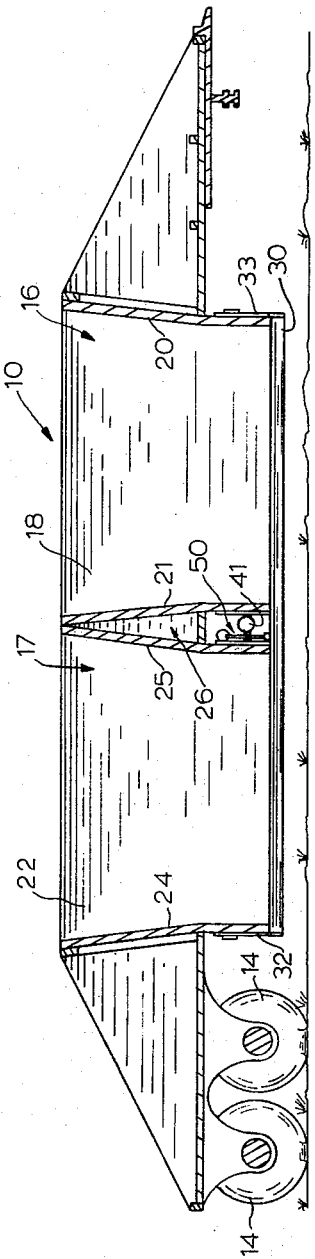
INVENTORS
Walter E. Ross, Jr.
Homer E. Gibbs
BY
B. B. Olive
ATTORNEY

United States Patent Office 3,361,478
Patented Jan. 2, 1968

3,361,478
BOTTOM DUMP TRAILER STRUCTURE
Walter E. Ross, Jr., and Homer E. Gibbs, Raleigh, N.C., assignors to Athey Products Corporation, Raleigh, N.C., a corporation of Illinois
Filed June 29, 1966, Ser. No. 561,462
9 Claims. (Cl. 298—35)

This invention relates to a load hauling trailer structure, and, more particularly, to a bottom dump trailer structure having a plurality of hopper receptacles and a pair of fluid actuated gates which close the bottom of the receptacles and which move in unison to dump the material being hauled.

Bottom dump trailers have been used for many years and are generally comprised of an open-bottomed receptacle which is supported at each end by ground engaging wheels and which is provided with opposed gates pivotally mounted on the receptacle. The opposed gates normally form a closure for the bottom of the receptacle and are selectively retractable to allow the housed material to fall downwardly through the receptacle and onto the ground or a like surface. Bottom dump trailers of this type have the tendency not to dump their load for the side and end walls thereof extend substantially vertically downwardly for a distance and then are tapered inwardly thus causing the hauled material to bridge across the tapered portions and prevent the downward flow of the material. Also, for most of the bottom dump trailers now in use, it is necessary that the body of the trailer be high enough in the air so that the gates will drop downwardly or pivot outwardly and still have good clearance between the distal edges of the gates in the open position and the ground. Thus, it can be seen that a high clearance increases the manufacturing cost of the trailer and results in a high center of gravity which reduces maneuverability and hauling capacity.

The bottom dump trailers of the prior art which employ pressurized fluid actuating means for moving the gates into open and closed positions generally are of the type having a power source such as a hydraulic cylinder for each gate. It can be seen that providing a power source for each gate along with its connecting means is expensive and results in a duplication of effort. Furthermore, it is desirable to move the various gates simultaneously and with equal speed; however, such movement is substantially impossible without the use of expensive fluid metering equipment.

Therefore, an object of this invention is to provide a bottom dump trailer which is inexpensive to manufacture and which is economical in operation.

Another object of this invention is to provide a bottom dump trailer with a single pressurized fluid power means for opening and closing the opposed gates simultaneously.

A further object of this invention is to provide a bottom dump trailer with a pressurized working cylinder which can be pivotally connected to and supported by the gate structure and positioned in a cavity defined by the body of the trailer and out of the path of movement of the gate structure.

Still another object of this invention is to provide a bottom dump trailer with a pair of pivotally mounted and oppositely swinging gates having a locking and unlocking means which can be controlled from a point remote with respect to the gates.

Yet another object of this invention is to provide a bottom dump trailer which is effective to dump the load in such a manner that the load dumped will not interfere with the continued advance of the trailer.

Yet a further object of this invention is to provide a bottom dump trailer with a pair of self-opening gates.

Yet still another object of this invention is to provide a bottom dump trailer with a system for opening and closing the pivotally mounted gates thereof which is adapted to be energized by either a hydraulic system or a pneumatic system.

Other objects and advantages of this invention will become apparent when the following detailed description is read in conjunction with the appended drawings, specification and claims. A preferred embodiment of this invention will now be described with reference to the accompanying drawings, in which:

FIGURE 1 is a perspective view of the bottom dump trailer showing the gates thereof in a closed or load carrying position and showing the trailer adapted to be attached to a tractor for draft;

FIGURE 2 is a plan view of the bottom dump trailer showing two material receiving receptacles and the downwardly and inwardly sloping walls which define the same;

FIGURE 3 is a section view taken along lines 3—3 of FIGURE 2 showing an equalizer linkage and the pivotally mounted gates in a closed position and, in skeletons, in an open position;

FIGURE 4 is a section view taken along lines 4—4 of FIGURE 2 showing the piston and cylinder energizing means connected to the gates in a closed position and, in skeletons, in an open position.

FIGURE 5 is a perspective view of the gates, the mechanism employed for operating the same and the locking means;

FIGURE 6 is a section view taken along lines 6—6 of FIGURE 2 showing the locking means and the gates in a closed position and showing, in skeletons, the locking means in an unlocked position;

FIGURE 7 is a section view taken along lines 7—7 of FIGURE 2 showing the continuous downwardly and inwardly sloping side walls of the receptacles;

FIGURE 8 is a section view taken along the lines 8—8 of FIGURE 2 and showing the end walls of the receptacles and the location of the fluid pressurized cylinder means with respect to the materials carrying receptacles; and FIGURE 9 is a schematic circuit diagram of the means for controlling the unlocking and locking mechanism and for opening and closing the discharge gates.

The bottom dump trailer structure of this invention is adapted to be connected to and pulled by a tractor of a common type having sufficient motivating power to move the trailer structure when fully loaded, the tractor and the usual "fifth wheel" not being shown or described. The trailer structure includes an elongated load supporting frame which mounts and supports forward and rear open-topped and open-bottomed receptacles. The forward receptacle is comprised of a pair of opposed side walls which slope inwardly and downwardly in continuous planes as if to converge, a front wall connecting the leading edges of the side walls and a downwardly and inwardly sloping rear wall which completes the peripheral boundaries of the forward receptacle. The rear receptacle includes opposed side walls which are aligned to form a substantial continuation of the opposed side walls of the forward receptacle, a rear wall and a front end wall which has its upper edge positioned in a contiguous relationship with respect to the upper edge of the rear wall of the forward receptacle. The front wall of the rear receptacle slopes inwardly and away from the rear wall of the forward receptacle and cooperates therewith to form an inverted V-shaped cavity. With respect to the material employed, it is contemplated that the bottom dump trailer of the invention may employ any of the usual structural materials; however, it has been found that welded aluminum construction is particularly advantageous because of its high tensile strength and low per unit weight.

A closure is formed for the open bottoms of the forward and rear receptacles by providing the same with a pair of opposed and outwardly swinging gates which are suspended beneath the receptacles by means of laterally positioned hinges which are pivotally mounted on the external surfaces of the receptacles. The hinges are arranged in pairs with two pairs being provided for each gate and which are adapted to be mounted on the forward and rear walls of the forward and rear receptacles.

The gates are moved into an open and closed position by means of a pressurized fluid operated cylinder and piston arrangement which is mounted in the previously mentioned inverted V-shaped cavity that is formed between the forward and rear receptacles and which has the cylinder housing pivotally connected to one gate and the piston rod pivotally connected to the other gate. The piston and cylinder arrangement is connected to a pressurized fluid source and upon the energization of the same, the gates are adapted to be forced outwardly or inwardly as required. A gate locking means is also mounted on the pair of gates with a latch being mounted on one selected gate and a latch catch being mounted on the other gate. The locking means is unlocked by an auxiliary pressurized fluid operated cylinder acting against an extension of the latch and is locked by gravity whereupon the latch falls into and is received by the latch catch. The controls for energizing the locking means and the piston and cylinder arrangement are arranged so that the locking means must be unlocked before the gates are energized to open.

To insure that each gate opens and closes the same distance as its mating gate, equalizer lever means are mounted on the forward and rear walls of the forward and rear receptacles, respectively, between pairs of selected hinges. Each lever means is provided with a lever and a pair of equalizing links which are pivotally connected to the lever and to the selected hinges so that when the pressurized fluid cylinder is energized, all of the gates move outwardly and inwardly in unison.

The invention is illustrated in connection with the accompanying drawings, in which the figures are illustrative of the preferred embodiment of the invention.

Trailer 10 is provided with rigidity by means of trapezoidal frame members 11 and 12 and a plurality of vertical, transversely arranged support members 13 which extend from and connect the major bases of trapezoidal frame members 11 and 12 with their minor bases. The rear end of trailer 10 is supported by ground engaging wheels 14 and its forward end is supported by a tractor (not shown) in the conventional manner. While not shown, it should be understood that a so called "fifth wheel" hitch forms part of the structure. Trapezoidal frame members 11 and 12 support forward and rear receptacles 16 and 17. Forward receptacle 16 which has an open top and an open bottom is peripherally defined by opposed side walls 18 and 19 which are respectively mounted on trapezoidal support members 12 and 11, respectively, and which slant inwardly and downwardly in a continuous plane as if to converge at an imaginary point. Side walls 18 and 19 are connected at the ends thereof by forward end wall 20 and rearward end wall 21 which also slope inwardly and downwardly. Rear receptacle 17 is peripherally defined by opposed side walls 22 and 23 which in effect are continuations of side walls 18 and 19, respectively, and by rear wall 24 and a front wall 25 which connect side walls 22 and 23. Front wall 25 of rear receptacle 17 is, at its upper edge, contiguous with rear wall 21 of forward receptacle 16 and slopes downwardly and away from rear wall 21 in a diverting relationship so as to form an inverted V-shaped cavity 26 (FIGURE 8). It can be seen that front wall 25 and rear wall 21 provide rigidity to trailer 10 and thus increase the load hauling capacity thereof without significantly decreasing its operable volume. Vertical support members 28 (FIGURE 1) and 29 (FIGURE 3) are utilized to strengthen the respective walls 20 and 24.

Trailer 10 has a novel bottom dump gate construction and includes two gates 30 and 31 which extend longitudinally the length of the bottom openings under forward and rear receptacles 16 and 17 and are adapted to form a closure for the same. While gates 30 and 31 are sometimes referred to in the sense of each being a single gate, it will be noticed that there are effectively two "gates" on each side and each pair of "gates" on each respective side is made and operates as an integral structure. Gate 30 is provided with two end hinges 32 and 33 and two intermediate hinges 34 and 35 and gate 31 is provided with end hinges 36 and 37 and intermediate hinges 38 and 39. End hinges 32 and 36 are mounted externally on rear wall 24 of rear receptacle 17 and end hinges 33 and 37 are pivotally mounted on the external surfaces of forward wall 20 of forward receptacle 16. Intermediate hinges 34 and 39 are pivotally mounted on the external surface of forward wall 25 of rear receptacle 17 and intermediate hinges 35 and 38 are mounted on the external surfaces of rear wall 21 of forward receptacle 16. Thus, it can be seen that gates 30 and 31 are pivotally mounted on and are supported by forward and rear receptacles 16 and 17 and are adapted to pivot inwardly to close the bottom portions thereof and outwardly to open the same for dumping. It will also be noticed that all of the hinge points are protected from falling material and that hinges 34, 35, 38 and 39 are mounted within the lower portion of cavity 26 which gives both protection and operation accessibility. It may also be observed that by having the pivoting points mounted in the respective hinges above and substantially adjacent the outer edges of gates 30 and 31, the gates are normally self-opening by means of the weight carried in the receptacles 16 and 17 since the greater moment arm is from the pivoting point to the inner edges of the gates. Thus once the gates are released the operator can depend on an exceptionally quick discharge of the material being hauled.

Gates 30 and 31 are moved outwardly and inwardly by means of a piston 40 and cylinder 41 arrangement which is energized by a pressurized fluid source (to be later described). The housing of cylinder 41 is pivotally mounted on a shaft 42 which is rigidly attached to and supported by hinges 38 and 39 and the rod of piston 40 is pivotally mounted on shaft 43 which in turn is supported by and rigidly connected to intermediate hinges 34 and 35. By supporting the piston 40 and cylinder 41 in the manner described, it can be seen that only one gate energizing source is needed for when piston 40 is pushed outwardly from cylinder 41, gates 30 and 31 are pushed outwardly which opens receptacles 16 and 17 for discharge of the material contained therein.

Since gates 30 and 31 are motivated by a single power means, it is desirable that one gate move no further than the other and that upon closing of the same the inner edges of gates 30 and 31 meet in the center of forward and rear receptacles 16 and 17. To insure that gates 30 and 31 move outwardly and inwardly in unison, a pair of equalizer lever means 44 and 45 are provided for the same. Lever means 44 is comprised of a lever 46 which is pivotally mounted between hinges 33 and 37 on forward wall 20 of forward receptacle 16. Lever 46 which is oval in shape is connected by means of link 47 to hinge 33 and by means of link 48 to hinge 37. Equalizer lever means 45 which is mounted on rear wall 24 of rear receptacle 17 and which is associated with hinges 32 and 36 is identical in function and structure to lever means 44 and will not be further described. Assuming for instance gate 30 swings more freely than gate 31, upon the energization of piston and cylinder arrangements 40 and 41 gate 30 would tend to swing outwardly faster than gate 31; however, since gates 30 and 31 are also interconnected by equalizer lever means 44 and 45, gate 30 through hinges 32 and 33 exert a tension force in link 47 and its counterpart thus rotating lever 46 and its counterpart and transferring the mentioned tensile force into a compression force in link 48 and its counterpart whereupon gate 31 is forced outwardly at the same speed as gate 30 by its hinges 36 and 37 which are pivotally connected to link 48 and its counterpart. Upon the closing of gates 30 and 31, the forces in links 47 and 48 and their counterparts would be reversed whereby gates 30 and 31 would move inwardly at the same speed and meet in the center of receptacles 16 and 17.

Gates 30 and 31 are provided with a lock mechanism 50 which is mounted thereon and in the cavity 26 defined by receptacles 16 and 17. Lock 50 is provided with a latch catch 51 which is rigidly mounted on the upper surface of gate 30 and is provided with an upwardly extending slightly bent finger portion 52. Gate 31 is provided with a rigidly secured mount 53 which pivotally receives a latch 54 having a downwardly and slightly curved finger portion 55 which when gates 30 and 31 are in a closed position is adapted to mate with and seat against finger portion 52 of latch catch 51. Latch 54 is provided with an upwardly extending arm 56 which is integrally mounted thereon and which is provided with a notch 57 in its upper end. When lock 50 is in a closed position notch 57 is adapted to rest against and receive a nub 59 mounted on the end of a spring loaded piston 60. Piston 60 partially resides in and is worked by an auxiliary rotochamber 61 which receives pressurized fluid from a source (to be later described) by means of fluid line 62. Rotochamber 61 is mounted between receptacles 16 and 17 in cavity 26 and is supported therein by means of angle beam 63. Nub 59 is provided with a shaft 64 which is slidably pivoted in an elongated opening 65 in lever arm 66. Lever arm 66 is pivotally mounted on a block 67 and is securely attached to receptacle 17 by any convenient means. Lever arm 66 is provided with a knob 69 which is adapted to impinge against a cam operated valve 68, cam operated valve 68 being adapted to control the flow of pressurized fluid into the piston 40 and cylinder 41 arrangement. Upon energizing rotochamber 61, spring loaded piston 60 is pushed outwardly and nub 59 engages and forces arm 56 in a clockwise direction as shown in FIGURE 6 which in turn pivots latch 54 about mount 53 thus disengaging finger 55 from its resting position of engagement with finger 52 of latch catch 51. As piston 60 is extended outwardly into its furthest position, knob 69 of lever arm 66 contacts cam operated valve 68 thus causing the pressurized fluid to flow into piston 40 and cylinder 41 arrangement.

Referring to FIGURE 9 there is illustrated a fluid control system employed in the invention and in which a source of pressurized fluid is designated by numeral 75. The pressurized fluid may either be a liquid or air depending upon the particular needs of the user and the diagram as shown in FIGURE 9 is contemplated to be adaptable to either system. Pressurized source 75 is connected to a manually operable gate valve 76 by means of line 77. Gate valve 76 is normally open and is remotely positioned with respect to the various elements of the invention and is generally adjacent the operator in the tractor portion of the vehicle. Line 80 connects gate valve 76 with rotochamber 61 and when gate valve 76 is open, spring loaded piston 60 resides almost completely within rotochamber 61. Upon the closing of gate valve 76, pressurized fluid is allowed to flow through line 80 and into rotochamber 61 whereupon piston 60 is forced outwardly and nub 59 engages arm 56 of lock 50 whereupon latch 54 is disengaged from latch catch 51 thus adapting gates 30 and 31 to be opened. As piston 60 is extended to its furthest position lever arm 66 is pivoted whereupon knob 69 engages cam operated valve 68. Cam operated valve 68 is normally open and is connected to pressurized source 75 by means of lines 84 and 85 and is connected to pilot operated valve 86 by means of line 87. Pilot operated valve 86 is fluid controlled and is connected to pressurized source 75 by means of line 84 and line 88 and is connected to cylinder 41 by means of lines 89 and 90. Cylinder 41 is double acting and line 89 supplies pressurized fluid thereto when piston 40 is retracted and gates 30 and 31 are in a closed position and line 90 is connected thereto to supply the working fluid for opening gates 30 and 31 by pushing outwardly on piston 40.

In operation, gate valve 76 which is normally open is manually closed thus allowing the pressurized fluid to travel from line 77 through gate valve 76 through line 80 and into rotochamber 61 whereupon piston 60 is forced outwardly and unlocks lock 50 and closes normally open cam operated valve 68. Pilot valve 86 is normally positioned to allow pressurized fluid to travel through line 84, line 88 and line 89 into cylinder 41 to maintain gates 30 and 31 in a closed position and upon the opening of cam operated valve 68 pressurized fluid is allowed to travel through line 84, line 85 and line 87 and is effective to reposition pilot operated valve 86. Therefore, upon the closing of cam operated valve 68, pilot operated valve 86 opens line 89 and connects line 90 with line 88 and source 75 whereupon pressurized fluid flows from line 88 through pilot operated valve 86, through line 90 and into cylinder 41 and piston 40 is forced outwardly thus causing gates 30 and 31 to open.

To close gates 30 and 31, manually operable gate valve 76 is opened which allows piston 60 to retract and become disengaged from cam operated valve 68 and the connection between line 85 and 87 to be opened whereby pilot operated valve 86 opens line 90 and reconnects line 89 with line 88 whereupon piston 40 is forced inwardly to close gates 30 and 31. Where the activating fluid is air, the air in cylinder 41 which is displaced by piston 40 is allowed to escape into the atmosphere as is the air which is displaced by the return of piston 60 into rotochamber 61. Where the pressurized fluid is a liquid, the displaced liquid in cylinder 41 and rotochamber 61 is carried by a line to a sump, this line and sump not being shown.

Lock mechanism 50 functions the same regardless of the fluid medium used to energize the various cylinders although its purpose is different. When a hydraulic system is employed, lock mechanism 50 is used as a safety device to prevent gates 30 and 31 from prematurely opening and for assuming most of the load which would normally be borne by piston 40 and cylinder 41 during travel. When a pneumatic medium is used, lock mechanism 50 is a necessity for air is highly compressible and when earth material or the like is dumped into receptacles 16 and 17, gates 30 and 31 tend to be forced open to overcome the pressure in the cylinder. Thus when the air system is used, lock 50 is a necessity to keep the gates from swinging open during the loading of receptacles 16 and 17 and in the liquid system, it serves as a safety device for taking the load off of the hydraulic system.

Having described the invention, what is claimed is:

1. In a load hauling trailer structure, the combination comprising:
   (a) an elongated load supporting frame;
   (b) forward and rearward open-bottomed receptacles supported by said frame, said forward receptacle being peripherally defined by opposed side walls, a front end wall and a rear end wall, said rearward receptacle being peripherally defined by opposed side walls in respective alignment with said opposed side walls of said forward receptacle, a rear wall and a front end wall having its upper edge contiguous with the upper edge of said rear end wall of said forward receptacle, the major portion of each of said side, rear and front walls sloping inwardly and the front wall of said rearward receptacle forming with the rear wall of said forward receptacle and between said foward and rearward receptacles an inverted V-shaped cavity;

(c) a pair of outwardly swinging opposed gates pivotally mounted on said receptacles and extending longitudinally beneath said elongated frame and said inverted V-shaped cavity, said gates adapted to form closures for the bottoms of both said receptacles;

(d) a free floating fluid pressure cylinder and piston means mounted in said cavity and operatively connected at one end to one of said gates and at the opposite end to the other of said gates, said cylinder and piston means being controllable to move said opposed gates outwardly to open and inwardly to close said receptacles;

(e) equalizer lever means connected to the forward and rearward ends of said opposed gates and mounted to pivot with respect to said receptacles and with respect to said gates whereby upon the operation of said cylinder and piston means, said gates open and close in unison; and (f) locking means located in said cavity and including a latch catch rigidly mounted on and movable with a selected gate and a latch securely mounted on and movable with the other gate and engaging said latch catch when said gates are in a closed position, said locking means being effective to render said piston and cylinder means inoperative when said latch is in engagement with said latch catch.

2. The load hauling trailer structure of claim 1 wherein the equalizer lever means is comprised of a pair of levers respectively rotatably mounted on the outside of said front wall of said forward receptacle and the outside of the rear wall of said rearward receptacle, each of said levers being provided with a pair of equalizer links pivotally connected thereto and pivotally connected to respective gates whereby upon the energization of said fluid pressure cylinder, said gates move outwardly to open and inwardly to close said receptacles in unison.

3. The load hauling trailer structure of claim 1 wherein said gates are supported by a plurality of pairs of opposed hinges with each gate having a pair of said hinges pivotally mounted respectively on the external surfaces of said forward and rear walls of said forward receptacle and on the external surfaces of said forward and rear walls of said rearward receptacle.

4. The load hauling trailer structure of claim 3 wherein the equalizer lever means is comprised of a pair of levers rotatably mounted respectively on the outside of said front wall of said forward receptacle and on the outside of said rear wall of said rearward receptacle and between said pair of opposed hinges, each of said levers being provided with a pair of equalizer links pivotally connected thereto and pivotally connected to selected adjacent hinges whereby upon the energization of said fluid pressure cylinder, said gates are adapted to move outwardly to open and inwardly to close said receptacles in unison.

5. The load hauling trailer structure of claim 1 wherein said locking means and said piston and cylinder means are activated by a fluid pressure source and are remotely controlled by a means whereby the flow of pressurized fluid into said fluid pressure cylinder and piston means is selectively controlled by said locking means.

6. The load hauling trailer structure of claim 5 wherein said fluid actuated gate locking means is in communication with said fluid pressure cylinder and piston means and is adapted to render said fluid pressure cylinder and piston means inoperative when said gates are in a locked position and operative to move said gates when in an unlocked position.

7. The load hauling trailer of claim 1 wherein said fluid pressure cylinder and piston means comprises a cylinder pivotally mounted on a selected gate at one end, a piston slidably received by said cylinder and having a piston rod pivotally mounted on said other gate and a remote controlled pressurized fluid source connected to said cylinder and adapted to extend or withdraw said piston whereby said gates are selectively opened and closed.

8. The hauling trailer of claim 7 wherein said gates are provided with a fluid actuated gate locking means, remote control means connected to said gate locking means for providing activating fluid to the same whereby said gates are selectively locked and unlocked, said remote control means being associated with said pressurized fluid source and being effective to render said pressurized fluid source inoperative when said gate locking means is in a locked position.

9. In a load hauling trailer structure, the combination comprising:

(a) an elongated load supporting aluminum frame;

(b) forward and rearward open-bottomed aluminum receptacles supported by said frame, said forward receptacle including a pair of opposed planar side walls positioned to slope inwardly in a converging relationship, a front wall connecting selected edges of said opposed side walls and an inwardly sloping rear wall positioned opposite said front wall and connecting said opposed side walls, said rearward receptacle having opposed planar side walls in respective alignment with said opposed side walls of said forward receptacle, a rear wall connecting said opposed side walls along selected edges and an inwardly sloping front wall connecting said opposed side walls and being positioned opposite said rear wall, said front wall having its upper edge contiguous with the upper edge of said rear wall of said forward receptacle, said forward wall of said rearward receptacle and said rear wall of said forward receptacle cooperating to form an inverted V-shaped cavity between said forward and rearward receptacle;

(c) a self-opening gate structure including a plurality of laterally positioned pairs of opposed hinges pivotally mounted on the external surfaces of said front and rear walls of said forward receptacle and on the external surfaces of said forward and rear walls of said rearward receptacle with each hinge of each pair of said hinges being in longitudinal alignment with a selected hinge of another pair of said hinges and a pair of parallel gates mounted on selected longitudinally aligned hinges and extending continuously beneath said forward and rearward receptacles, said gates adapted to form a closure for said open-bottomed receptacles;

(d) gate actuating means mounted in said inverted V-shaped cavity above said gates and comprising a pressurized fluid operated cylinder pivotally connected at its closed end to a selected gate, a piston slidably mounted in said cylinder and having a piston rod pivotally connected to the other gate and a remote controlled pressurized fluid source connected to said cylinder and adapted to extend or withdraw said piston a selected distance whereby said gates are selectively opened and closed;

(e) equalizer lever means including a pair of levers being rotatably mounted respectively on the outside of said front wall of said forward receptacle and the outside of said rear wall of said rearward receptacle and between said pair of opposed hinges, each of said levers being provided with a pair of equalizer links pivotally connected thereto and pivotally connected to selected adjacent hinges whereby upon the energization of said fluid pressure cylinder, said gates are adapted to move outwardly to open and inwardly to close said receptacles in unison; and (f) fluid actuated locking means residing in said inverted V-shaped cavity and having a latch catch mounted on and movable with one gate, a latch mounted on and movable with the other gate and adapted to engage said latch catch, and pressurized fluid means in communication with said latch being adapted to render said gate actuating means inoperative when said locking means is closed and to render said gate actuating means operative when said locking means is open.

References Cited

UNITED STATES PATENTS

| | | | |
|---|---|---|---|
| 2,268,290 | 12/1941 | Landis | 298—35 |
| 2,723,878 | 11/1955 | Rockwell | 105—250 X |
| 2,729,503 | 1/1956 | Armington | 298—35 |
| 2,836,461 | 5/1958 | Shadwick | 298—35 |
| 3,076,680 | 2/1963 | Kress | 298—35 |
| 3,198,579 | 8/1965 | Adams | 298—35 |

RICHARD J. JOHNSON, *Primary Examiner.*